Oct. 3, 1967  R. C. LANGLEY ET AL  3,344,586
GAS SEPARATION APPARATUS
Filed June 22, 1965   2 Sheets-Sheet 1
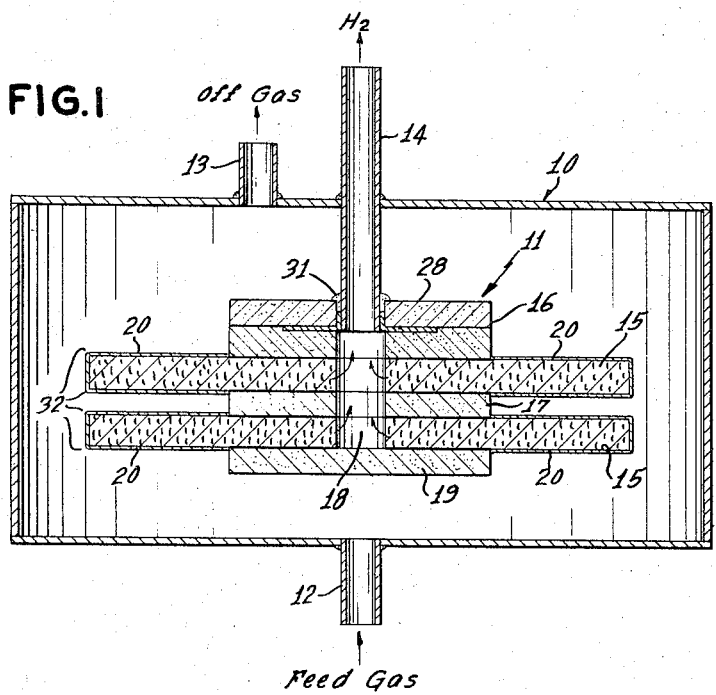
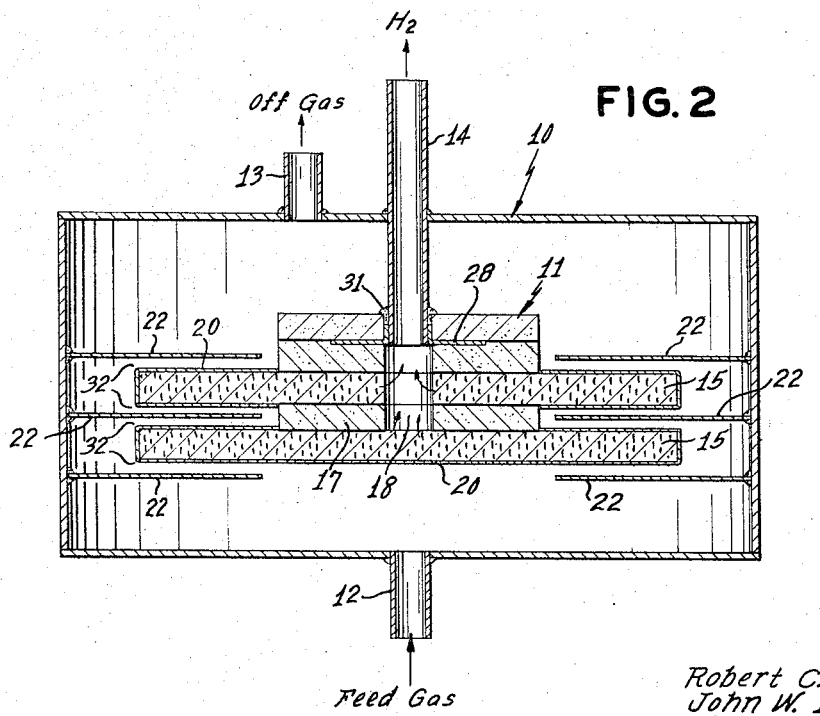
INVENTORS
Robert C. Langley
John W. Lindenthal
William C. Pfefferle
ATTORNEY

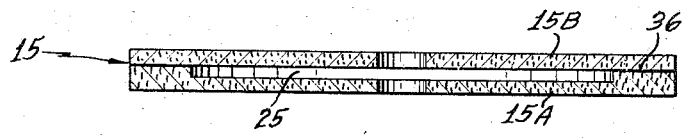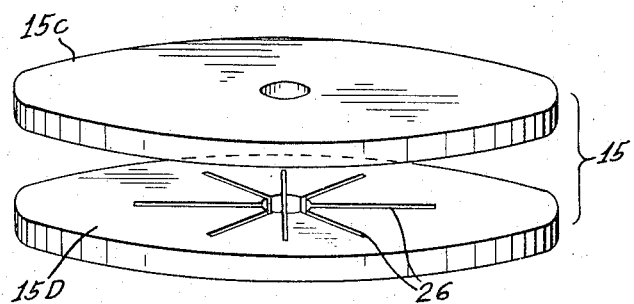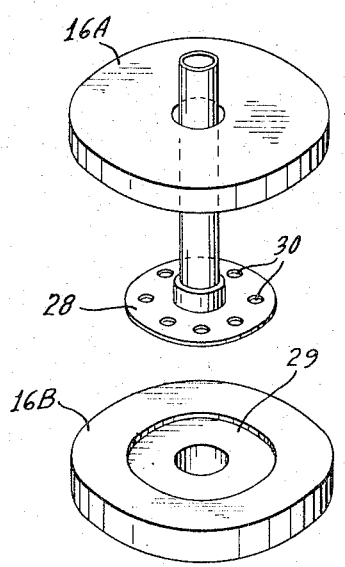

United States Patent Office

3,344,586
Patented Oct. 3, 1967

3,344,586
GAS SEPARATION APPARATUS
Robert C. Langley, Millington, John W. Lindenthal, Freehold, and William C. Pfefferle, Middletown, N.J., assignors to Engelhard Industries, Inc., Newark, N.J., a corporation of Delaware
Filed June 22, 1965, Ser. No. 465,861
5 Claims. (Cl. 55—158)

The present invention relates to apparatus for separating a gas, such as hydrogen, from a mixture of gases by diffusion through a non-porous membrane made of material through which the gas to be separated is selectively permeable.

Gas separating apparatus of the general type disclosed herein is used for purifying and/or separating a gas mixture into its components.

It is known that certain gases such as hydrogen, oxygen and helium selectively permeate and diffuse through certain non-porous materials. For example, hydrogen will diffuse through palladium, oxygen will diffuse through silver and helium will diffuse through vitreous silica. This phenomenon is made use of in apparatus for separating a gas from a mixture by bringing the gas mixture into contact, usually at an elevated temperature and under pressure, with a thin non-porous membrane of the material through which the gas to be separated will diffuse.

The rate of diffusion of a gas through a particular selectively-permeable non-porous membrane is a function of the surface area of the membrane, its thickness, the pressure differential across it and the temperature.

In particular, the diffusion rate is increased by making the membrane thin and increasing the pressure differential across it, but these factors are generally structurally inconsistent. If the membrane is made thinner, it is weaker and withstands less pressure. Conversely, if the pressure is increased, the membrane must be given added strength, either by thickening it, which reduces the diffusion rate, or by providing a pressure-resistant support for the membrane.

Hydrogen diffusion apparatus employing thin walled tubes or thin foil consisting of palladium or palladium-containing alloys is known. It has been found that tubing is harder to fabricate and quality control than foil, and as a practical limit tubing of high quality, i.e. pin-hole free, requires a minimum thickness of about 3 mils. Palladium foil can be made thinner than tubing, but very thin foil is very fragile and hard to handle. Further, thin foils of the order of 1 mil must be supported in order to withstand the pressure differential normally employed across the foil in hydrogen diffusion processes.

Heretofore, considerable effort has been made to obtain suitable porous supports for thin foils. Supports of many materials have been suggested, including sintered metals and ceramics. The difficulty with all such supports is that the thin palladium foil undergoes dilation due to hydrogen adsorption and is not retained in conformity to the supporting surface. In addition ceramic supports have the problem of the differential expansion between the high expansion palladium metal and the low expansion ceramic. As a result wrinkles and cracks develop in the foil which leads to undesirable porosity.

In order to avoid such difficulties, it has been proposed to deposit thin palladium films as an integral part of the surface of porous supporting structures, such as porous metal or porous ceramic. While sintered metals have been proposed for this purpose, at high temperature, intermetallic diffusion occurs which results in loss or undesirable alloying of the surface supported palladium film with the porous base metal. Ceramic supports for integral thin films, while having certain recognized advantages, have heretofore been disregarded because of the inherent low tensile strength of ceramics as a result of which ceramic materials do not withstand pressure applied normally to their surface, especially when applied to small areas such as the area under gaskets, etc., necessary in the fabrication of high pressure diffusion apparatus.

The present invention employs exceedingly thin hydrogen diffusion films in contrast to foils, which films are supported on ceramics and structurally integral therewith, and has as its principal object the provision of apparatus for gaseous diffusion wherein a ceramic support for the diffusion film is supported in a manner such that the ceramic support and the complete assembly are subject only to isostatic pressure.

Another object of this invention is to provide hydrogen diffusion separation apparatus in which the diffusion membrane is formed by coating the diffusion material on the surface of a porous ceramic support to provide a thin firmly-supported film of the diffusion material of substantially uniform thickness thereby to achieve an efficient flow rate with economy of diffusion material.

These and other objects of the hydrogen diffusion apparatus of the present invention will be apparent from the following description and accompanying drawings in which:

FIGURE 1 is a side elevation in section of an illustrative embodiment of gas diffusion separation apparatus in accordance with the present invention, FIGURE 2 is a side elevation in section of a second illustrative embodiment of apparatus in accordance with the invention, FIGURE 3 is a side elevation in section of an alternative form of disk which comprises a part of a diffusion element in accordance with the present invention, FIGURE 4 is an exploded isometric view of another form of disk for a diffusion element in accordance with the invention, and FIGURE 5 is an exploded isometric view of connecting means for securing the diffusion element to the separated gas outlet in the apparatus shown in FIGURES 1 and 2.

Referring now to the drawings, hydrogen diffusion separation apparatus in accordance with the invention comprises generally a chamber 10 having a gas diffusion assembly 11 supported therein. Impure feed gas containing hydrogen enters the chamber 10 through an inlet tube 12 shown fixed through the bottom wall of the chamber 10. The off gas from which hydrogen has been separated flows out of the chamber 10 through an outlet tube 13 shown secured through the top wall of the chamber.

The diffusion assembly 11 is a rigid body of ceramic material, a large portion of which is porous ceramic material with the exterior surfaces of the porous ceramic portions of the assembly 11 being coated with a thin surface coating of non-porous hydrogen-permeable material, such as palladium, or palladium-containing alloys. The ceramic diffusion assembly 11 is attached to a pure gas outlet tube 14 which is secured through the upper wall of the chamber 10.

The walls of the chamber 10, the inlet and outlet tubes 12 and 13, and the pure gas outlet conduit 14 are suitably made of stainless steel.

Referring to FIGURE 1, the diffusion assembly 11 is formed of one or more thin flat elements 15 of porous ceramic material secured to the pure gas outlet conduit 14 by a ceramic flange 16 in a manner subsequently described in detail. As shown, more than one of the porous ceramic elements 15 may be provided, in which case, the plurality of elements 15 are arranged in a stack and are held spaced apart by a spacing member 17 between each adjacent pair of elements 15. Only one pair of elements 15 with an intermediate spacing member 17 is shown, but it will be appreciated that any desired number of elements 15 and spacing member 17 may be included in the stack.

The elements 15 are normally circular, but the particular shape is not restricted to round disks. For example, the elements may be squire, rectangular, or generally polygonal, but, it is desirable that the diffusion elements have a minimum number of sharp corners. Similarly, the peripheral shape of the spacing member 17 is not critical, but the spacing member 17 is made to have a smaller circumference than the element 15 so that the outward portions of the elements 15 extends beyond the spacing member 17 in the nature of fins to provide large exterior surface areas.

The elements 15 and the spacing member 17 each have a central bore therethrough and the elements and spacing member are axially arranged in the stack with their bores in line to provide an axial bore 18 within the stack. At the bottom of the stack, a gas imprevious cap 19 is secured to the underside of the bottom element 15 to cover, and thus block, the lower end of the bore 18. At the upper end of the stack, the bore 18 opens through the flange 16 into the pure gas outlet conduit 14 so that the conduit is in gas flow communication with the bore.

An alternative embodiment of the present invention shown in FIGURE 2 is generally similar to the embodiment described above with reference to FIGURE 1, and in both figures, like numeral refer to like elements. In the apparatus shown in FIGURE 2, the bottom of the diffusion assembly 11 is formed by the lowermost element 15 which is formed without the central bore so that the bottom cap 19 is dispensed with. Also, as illustrated in the embodiment shown in FIGURE 2, baffles 22 are provided within the chamber 10 and located so as to direct the flow of impure feed gas closely around and into good contact with the exterior surfaces of the diffusion assembly 11.

The membrane through which hydrogen diffuses is provided by a thin film 20 consisting of a suitable gas-permeable material, such as palladium or an alloy of palladium, coated on the exposed external surfaces of the porous ceramic portions of the diffusion assembly 11.

In practice, for economy of manufacture and assembly, the ceramic elements 15 are ordinarily the only portions of the diffusion assembly 11 made of porous ceramic, and the other portions, namely the ceramic flange 16, spacing member 17 and cap 19, are normally made of non-porous ceramic material. It is to be understood, however, that the other ceramic portions of the assembly 11 may also be made of porous ceramic suitably coated on the exterior surfaces with a hydrogen-permeable film, without departing from the spirit or scope of the present invention.

For the practice of the present invention, the ceramic material of the diffusion assembly 11 must be highly resistant to physical and thermal shock. The ceramic portions which are porous (i.e. elements 15) must, in addition, be sufficiently porous for gas to flow through, yet the surface should have a smooth finish in order to be able to coat a thin unbroken film 20 of non-porous hydrogen-permeable material over the exterior surfaces of the porous portions of the assembly 11.

Because of the extreme temperatures used in forming the assembly of porous and non-porous elements which are employed in the apparatus of this invention, expansion differences between the porous and non-porous ceramic elements must be avoided. In practice, this is achieved most readily by making the non-porous ceramic components of the same composition as the porous components of the assembly, and by avoiding use of any pore-forming additives in the porous elements which leave residues affecting the ceramic composition.

In practice, the porosity of the porous portion is provided by adding carbon powder to the mix and firing the mix at a temperature and for a time sufficient to burn out the carbon powder while keeping the temperatures as low as possible so as to reduce as much as possible the densification of the body formed by the melting of alkali aluminum silicates in the mix. In making the non-porous portion, the mix is fired at a higher temperature (usually 20°–30° C. higher) than the mix for the porous portion so as to increase the density of the glass, and hence the over-all density of the non-porous portion.

It is also important that the ceramic body in the hydrogen diffusion apparatus be free of reducible components such as lead, iron or tin, for example, since the hydrogen-containing gases being separated or purified provide a reducing atmosphere within the separating apparatus and reducible components could react adversely with the thin metal film.

The ceramic material of the body of the diffusion assembly 11 comprises generally from 50–90% by weight alkali aluminum silicates, 10–50% clay, and from 0–10% silica. It has been found that the free silica content should not exceed 10% by weight of the ceramic mix to provide a fired ceramic of low thermal expansion and good resistance to shock.

The particular components and their percentage in the mix may be varied to some extent and still produce thermal and structural properties which will be suitable for providing a ceramic support for a non-porous hydrogen-permeable membrane coated thereon in accordance with the invention. In practice, nepheline syenite has proved a particularly suitable alkali aluminum silicate, and the clay component is preferably made up of a mixture of kaolin, which is included for its purity, and ball clay, which provides plasticity and strong bonding power. In preparing the ceramic parts of the ceramic body, the silicate, clay and silica are thoroughly mixed dry, and then glycerin or water mixed with a binder, such as polyvinyl alcohol, methyl cellulose, acrylic resin, or polyethylene glycol, for example, is mixed in the dry materials to form a cohesive plastic mass suitable for molding into the desired shape. An emulsion of microcrystalline wax has also proved to be a good binder and lubricant. As discussed above, carbon powder, such as fine carbon black, is incorporated in the mix from which the porous parts of the ceramic body are to be formed. The carbon black is suitably provided in the amount of 20–40% by weight, of the total weight of the other dry ingredients of the mix.

The green-molded parts which are to be porous, and thus include the carbon black, are fired in a periodic furnace which is progressively heated from room temperature to about 1100° C. over a 24-hour period. The furnace is then allowed to cool slowly to about room temperature again before the fired parts are removed. The green non-porous molded parts are fired in a periodic furnace which is heated to about 1138° C. over an 8-hour period, and then allowed to cool slowly to about room temperature again before the parts are removed. The firing may also be done in a continuous furnace, in which case the time required would be reduced to about one-third the time required in the periodic oven.

The following detailed procedure is provided in order to illustrate a preferred method for preparing a porous ceramic support suitable for use in the apparatus of this invention:

Preparation of element 15

A dry mixture of 25% of Georgia kaolin, 15% Tennessee ball clay, 55% nepheline syenite, and 5% silica is made by tumbling these ingredients in a bottle for several hours after which 200 mesh carbon black is added and thoroughly mixed in by further tumbling for about 8 hours. The porosity of the finished piece is largely determined by the amount of carbon black used and for a porosity of 40–50%, which is preferred in accordance with the invention; the proportion of carbon black to the other ingredients is about 20 to 40%.

When the dry mixing is complete, the mixture is dampened with a fluid which serves as a binder and lubricant. The moisture content is preferably about 25–30%, which supplies the moisture necessary to be able to press the mass into the desired disk shape satisfactorily. The fluid is suitably 3–10% glycerine as the binder and the remainder water as the lubricant.

The fluid is mixed in to dampen the mixture thoroughly. Then the mixture is pressed into the desired shape, e.g. a disk from 1 to 3 inches diameter by ⅛-inch thick, in a stainless steel mold at 5000 p.s.i. These disks are then air dried overnight and fired in a periodic furnace which is raised to a temperature of about 1100° C., progressively over a period of about 24 hours, followed by slow cooling to room temperature.

The element 15 may be formed and molded as a single porous but solid disk as indicated in FIGURES 1 and 2, or in the forms illustrated in FIGURES 3 and 4. The element 15, in whatever form, provides a base or support for the non-porous film 20 which is coated on the exterior surfaces of the element 15 to provide a hydrogen-permeable membrane through which hydrogen gas diffuses into the interior of the element. In the case of the solid form of elements 15 shown in FIGURES 1 and 2, the gas which diffuses through the film flows through the interior of the element 15 to the central bore due to the porosity of the disk. In the alternative structures of the elements 15 shown in FIGURES 3 and 4, the disks may be formed with hollow interiors or vein-like channels to assist the flow of gas through the interior of the disk. Hollows in the centers of the disks can be made by including a piece of filter paper or other completely combustible material in the compact before pressing.

In general, it is preferred to have the elements as thin as possible, consistent with strength, to reduce the resistance to gas flow. Preferably, the elements are ⅛ to ¼-inch in thickness, and channels or pores are provided to reduce the effective thickness to about 1/16 to ⅛-inch.

Looking at FIGURE 3, an alternative form of element 15 has a chamber 25 therein formed by making the element in two parts—a dished bottom part 15A and a cover part 15B which is secured over the dished side of the bottom part 15A. The parts 15A and 15B are molded and fired separately. Then the cover part 15B is secured over the bottom part 15A. The two parts may be secured together by brushing powdered glaze material, such as Pemco frit P–1701, on the adjacent edge surfaces of the two parts which are in contact, and firing to melt the glaze and fuse the parts together.

A third alternative form of element 15 shown in FIGURE 4 is provided by forming the element in two similar halves 15C and 15D. The two halves are molded and, while in the green state, radical channels or grooves 26, extending from the central bores part way to the peripheral edges of the halves, are incised on one side of each half. The grooved sides are placed against each other and the two halves attached together into a single element 15 by suitable means such as by fusing with glaze material in the manner described with reference to the disk shown in FIGURE 3.

As mentioned above, the diffusion membrane through which the hydrogen diffuses is provided by a thin film 20 of diffusion material supported on the exposed external surfaces of the elements 15. The film 20 on the elements 15 is composed of a film containing palladium or palladium alloys for separating hydrogen from a gas mixture containing hydrogen.

Examples of palladium alloys which are suitable for use in making non-porous hydrogen-permeable membranes for separating hydrogen from a gas mixture and which may suitably be incorporated in films 20 in accordance with the invention are palladium alloyed with gold, with platinum, with ruthenium, or with a combination of gold and silver. An alloy of palladium with 25 wt. percent silver is also well known and widely used in the art for hydrogen diffusion.

The palladium or palladium alloy film can be deposited as a thin continuous non-porous film on ceramic elements 15 by application of organic solutions of palladium metallo-organic compounds such as have heretofore been employed in the decorating art. In the decorating art, palladium or palladium alloy film from organic solutions give relatively thin films of the order of 500–1000 Angstroms per coat. Such thin films are unstable at high temperatures, and it has been found advantageous in preparing a non-porous continuous film to apply multiple coats with each application fired only to 250–300° C. When a total thickness of about one micron (10,000 A.) has been applied, the film is thermally stable when fired at 1000° C.

Using the aforementioned technique, non-porous strongly adherent palladium and palladium alloy films have been prepared on a ceramic base such as described hereinbefore by employing the following typical formulations:

(A)

| | G. |
|---|---|
| Pd resinate solution (9% Pd) | 3.0 |
| Chloroform | 2.0 |
| Oil of peppermint | 3.0 |

(B)

| | |
|---|---|
| Ag naphthenate (32% Ag) | 0.94 |
| Pd resinate solution (9% Pd) | 10.0 |
| Oil of rosemary | 9.06 |

(C)

| | |
|---|---|
| Pd resinate solution (9% Pd) | 6.0 |
| Gold resinate solution (24% Au) | 0.56 |
| Oil of peppermint | 5.44 |

Alternatively, the palladium film can be prepared on a ceramic support by application of a suspension of finely-divided palladium powder in an aqueous or organic solvent medium, preferably applied in a number of successive coats until the desired final thickness of the film is attained.

For example, a slurry of 325 mesh palladium powder in water was applied to a porous ceramic disk 2⅝-inch in diameter. The coated disk was fired at 1100° C. in air for ½ hour. This procedure was repeated ten times The resultant disk with a palladium coating thereon was tested for hydrogen diffusion. At 500° C., 15 p.s.i.g. hydrogen pressure, the hydrogen diffusion rate was 40–45 cc./minute/square inch.

Similarly, a porous ceramic disk prepared as described hereinabove was coated with a homogeneous mixture consisting of:

| | Parts by weight |
|---|---|
| Pd powder (325 mesh) | 70.0 |
| Rosin | 12.0 |
| Terpineol | 18.0 |

The rosin was dissolved by heating at 100–150° C. in the terpineol. The Pd powder was first added in increments and wetted by manual stirring. The thick mass was then passed twice through a three roll ink mill, and the resultant thick paste thinned with turpentine to a consistency suitable for brush application. Multiple coats of this suspension, with intermediate firing at 1100° C. were applied to the porous ceramic disk to produce a film of about 0.2 mil thickness. This film was thermally stable, adherent, non-porous, and exhibited excellent diffusion properties for hydrogen.

A preferred method for producing a palladium film on porous ceramic consists in applying a slurry of powdered palladium and a powdered glaze material in water to the surface of the disk and thereafter firing to provide a glaze coating having particles of palladium dispersed throughout the coating, as more fully described in copending application Ser. No. 465,999 of Robert C. Langley and Herbert Myers, filed June 22, 1965. Following the procedures taught in the aforesaid application, a palladium-containing coating was prepared as follows:

Pemco glaze P–1701 (325 mesh powder) was mixed thoroughly with 325 mesh powdered palladium in a ratio by weight of about 91% palladium—9% glaze. Water was added to form a slurry suitable for applying by brush, and a thin coat of the slurry was painted on a disk 15 made as described hereinabove. The coated disk was then fired to 1000° C. with a one-hour soak.

Four additional coats were similarly applied by brushing on a thin coat of the slurry and firing. It was found desirable to apply at least five thin coats in this manner in order to assure a continuous coating without leaks.

The element 15 with this glaze containing film 20 was then assembled in apparatus in accordance with the invention and tested. It did not leak at a pressure of 30 p.s.i.g. nitrogen at a temperature of 600° C. Hydrogen supplied at the same temperature and pressure diffused through an area of film of about 0.8 square inch at a rate of about 177 cubic centimeters per minute.

Glaze coatings containing palladium and glaze in ratios of from about 50% to about 96% palladium by weight of the coating were applied in the same manner, and tested for hydrogen diffusion. These coatings also did not leak at pressures of 30 p.s.i.g. nitrogen at 600° C. and hydrogen diffused through them at varying rates in proportion to the palladium content of the coating. The highest rate of diffusion, of course, was through the coating having the highest palladium content, but a palladium content of about 90–91% provides about the most efficient diffusion rate in relation to the amount of palladium used. This is a significant factor in view of the high cost of palladium.

The ceramic flange 16 provides means for securing the ceramic diffusion assembly 11 to the metal outlet conduit 14 to connect the bore 18 through the assembly 11 in gas flow communication with the outlet conduit 14. It was a problem to provide this connection in view of the differences in the coefficients of thermal expansion of the metal and ceramic and the high temperatures (in the range from room temperature to about 1150° C.) and pressures (up to about 1000 p.s.i.g.) to which the connection is subjected. A satisfactory connection has, however, been found as more fully disclosed in copending application Ser. No. 465,908 of Robert C. Langley, filed June 22, 1965, and is provided as shown in FIGURES 1 and 5 by welding a metal flange 28 around the lower end of the outlet conduit 14 and embedding the metal flange 28 in the ceramic flange 16 which is then bonded to the uppermost ceramic element 15.

The ceramic element 15 has a lower coefficient of expansion than the metallic conduit 14 and the ceramic flange 16 is preferably made of the same ceramic material as the elements 15. The metal flange 28 is made of an alloy which has a coefficient of thermal expansion compatible with or between the coefficients of expansion of the metal of the conduit 14 and that of the ceramic 16. In practice, when the metallic conduit 14 is stainless steel, alloys, such as the alloys sold under the trademarks "Kovar" and "Therlo," composed of about 20–30% nickel, 15–30% cobalt, under 1% manganese, and the balance iron, have proved suitable for the metal flange 28.

As illustrated in FIGURE 5, the metal flange 28 may be embedded in the ceramic flange 16 by forming flange 16 of two elements 16A and 16B and sandwiching the metal flange between them. The elements 16A and 16B each have a hole through the center, the hole through the upper element 16A being large enough for the outlet conduit 14 to fit through loosely, and the diameter of the hole in the lower element 16B being approximately the same as the diameter of bore 18 in the diffusion assembly 11. The lower element 16B is also provided with a well or recess 29 into which the flange 28 fits so that the elements 16A and 16B come together around the flange. To assemble this unit, the flange 28 is seated in the well 29 and powdered glass forming material, such as Pemco frit P–1701 in an aqueous suspension is brushed onto the upper surface of the lower element 16B and over the flange 28. The upper element 16A is placed on top of the lower element 16B and over the flange 28. Then the unit is fired to fuse the glaze and thereby secure the two disks together around the metal flange 28. With Pemco frit P–1701, the fusing is accomplished by firing to a temperature of about 1000° C. with a 60-minute soak.

As shown in FIGURE 5, the flange 28 is provided with a plurality of holes 30 through which the glaze fuses to provide additional points of bonding and securely anchor the flange 28 against lateral movement.

An excess of glaze is used to assure sealing all crevices and cracks and, particularly, sufficient glaze is applied to fill the annular space between the hole through the upper element 16A and the outlet conduit 14 as indicated at 31 in FIGURES 1 and 2.

In making the diffusion assembly 11, the elements 15 are first coated with a non-porous hydrogen-permeable film 20 on their upper and lower surfaces. It has been found difficult to form a continuous unbroken metallic film around the sharp edges 32 of the element 15 and, in practice, these edges are preferably covered with a glaze to seal them. The central portions of the element 15 to which the adjacent parts of the diffusion assembly 11, specifically spaced members 17, are bonded need not be coated. Then the element 15, ceramic flange 16, spacing member 17 and, in the embodiment shown in FIGURE 1, the cap 19 are secured together in a stack by brushing the interfacial surfaces with an aqueous solution of a powdered fusible glaze such as Pemco frit P–1701. The assembly is then fired to fuse the glaze and bond the members together. The completed diffusion assembly 11 is then enclosed in a chamber 10 with the outlet conduit 14 secured through a wall of the chamber by welding, brazing or other suitable means.

Throughout this specification, reference has been made to powdered fusible glaze materials which are variously used to form non-porous coatings on portions of the ceramic elements of the apparatus, to secure the various elements of the assembly one to the other and to form the palladium-glaze films which serve as the hydrogen diffusion membrane in the apparatus. While the apparatus of the present invention has been described with relation to a particular glaze, it will be understood that various conventional high temperature ceramic glazes can be employed for these purposes. Those skilled in the art will select a glaze having expansion characteristics which match the ceramic substrate so as to avoid problems of differential expansion. Further, the glaze should soften at a temperature above the operating temperature of the diffusion assembly, for example, above about 700° C. and preferably above 800° C., so as to maintain the seals and structural strength of the assembly in the hydrogen diffusion temperature range of normally 400° to about 800° C. The glaze should of course have a softening and melting temperature below the softening temperature of the ceramic elements employed in the assembly to avoid distortion thereof and, in the case of the porous elements, loss of porosity. Generally glazes which melt at about 1000° C. are employed.

Satisfactory glazes generally consist of admixtures of alumina and silica containing various other oxide components, including, e.g., boria, calcium oxide, strontium oxide and the like, which components are incorporated in the glaze to provide specific thermal expansion and softening properties. Among the commercially available glazes which have been found satisfactory for the purposes set forth herein are Pemco P–1701, Corning 7056 and Ferro 3292. The nominal oxide composition of commercially available glazes which have been found suitable is given in the following table.

TABLE

| Ingredients as Oxides | Parts by Weight of— | | |
|---|---|---|---|
| | Glaze "A" (1) | Glaze "B" (2) | Glaze "C" (3) |
| Al₂O₃ | 13.6 | 5.5 | 15.7 |
| SiO₂ | 44.9 | 70.6 | 51.3 |
| B₂O₃ | 35.4 | 45.1 | 29.0 |
| K₂O | 3.5 | 19.3 | 7.5 |
| Na₂O | 2.7 | 1.4 | 4.0 |
| CaO | 9.5 | 0.4 | 36.4 |
| SrO | 17.7 | 0.7 | 43.8 |
| | 127.3 | 143.0 | 187.7 |

In operation, an impure feed gas containing hydrogen is fed into the chamber 10 at a positive pressure through the inlet tube 12. Heat is normally provided by heating elements (not shown) around the outer walls of the chamber. Alternatively, or in addition, the feed gas may be preheated before it is fed into the chamber. Hydrogen in the feed gas diffuses through the films 20 into the porous ceramic material of the elements 15 through which it passes to the bore 18 and thence out the outlet conduit 14 to the point of storage or use. The off gas remaining after hydrogen has been removed from the feed gas flows out the outlet tube 13.

It will be appreciated that the ceramic diffusion assembly of the present invention is capable of withstanding high pressures since ceramics in general are strong in compression, and no pressure other than isostatic pressure is actually exerted on the diffusion assembly. By employing a diffusion assembly of this design, and eliminating any requirement for application of pressure at the edges of the ceramic support for gasketing or other purposes, forces in tension resulting in unequal stress which would crack the ceramic support are totally eliminated.

In practice, a diffusion separation unit constructed of the materials and in the manner described above withstood pressures of up to 1000 p.s.i.g. nitrogen at 25° C. without any sign of rupturing the film 20 or the ceramic disk 15. Thereafter, feed gas consisting of 50% hydrogen was fed into the chamber 10 under a pressure of 150 p.s.i.g. and at a temperature of 500° C. in the chamber and hydrogen having a purity of about 98% was separated from the mixture by the diffusion assembly 11.

The film 20 and ceramic element 15 of the invention have also been subjected to a pressure of 450 p.s.i.g. nitrogen at 500° C. without sign of rupture of the film or damage to the support.

It will be understood that the above description is of a preferred embodiment of apparatus in accordance with the invention and that some modifications and variations may be made in the structure and arrangement described without departing from the spirit or scope of the invention defined by the following claims.

What is claimed is:
1. Apparatus for separating a gas from a mixture of gases comprising in combination a chamber having an inlet and an outlet for the passage of a mixture of gases through the chamber, a gas diffusion assembly in the chamber, and a conduit for conducting separated gas from the diffusion assembly to the outside of the chamber, said diffusion assembly comprising a plurality of thin, flat elements of porous ceramic material arranged axially in a stack with a spacing member secured between each adjacent pair of elements, said spacing members each having a smaller circumference than the adjacent elements, said stack having an axial bore therein, said conduit being secured to the stack in gas flow communication with the bore, and a non-porous film of material selectively permeable to hydrogen coated on exterior surfaces of the stack to form a selective gas permeable membrane between the porous interior of the elements and a mixture of gases containing hydrogen in the chamber.

2. Apparatus of claim 1 wherein the non-porous film comprises a hydrogen-permeable metal selected from the group consisting of palladium and palladium-containing alloys.

3. Apparatus of claim 1 wherein the porous ceramic elements are partially coated with a gas-impervious glaze.

4. Apparatus for separating a gas from a mixture of gases comprising in combination a chamber having an inlet and an outlet for the passage of a mixture of gases through the chamber, a gas diffusion assembly in the chamber, and a conduit for conducting separated gas from the diffusion assembly to the outside of the chamber, said diffusion assembly comprising at least one thin flat element of porous ceramic material having an axial bore closed at one end, a ceramic flange on the conduit and secured to the element in position to fix the conduit in gas flow communication with said bore, and a non-porous hydrogen-permeable film coated on exterior surfaces of the disk to form a hydrogen-permeable membrane between the porous interior of the disk and a mixture of gases in the chamber.

5. Apparatus of claim 4 wherein the porous ceramic element contains internal channels to increase the flow of hydrogen.

References Cited

UNITED STATES PATENTS

| 2,824,620 | 2/1958 | De Rosset | 55—16 |
| 3,203,086 | 8/1965 | Eyraud et al. | 55—16 X |
| 3,238,704 | 3/1966 | Straschil et al. | 55—158 |
| 3,241,298 | 3/1966 | Pierce | 55—158 X |

FOREIGN PATENTS 969,673  9/1964  Great Britain.

REUBEN FRIEDMAN, *Primary Examiner.*

J. ADEE, *Assistant Examiner.*